(12) United States Patent
Purves et al.

(10) Patent No.: US 11,093,941 B2
(45) Date of Patent: *Aug. 17, 2021

(54) ELECTRONIC SYSTEM HARDWARE FOR SECURE PAYMENTS FOR VEHICLES

(71) Applicant: Visa International Service Association, San Francisco, CA (US)

(72) Inventors: Thomas Purves, San Francisco, CA (US); Bryan Carroll, Livermore, CA (US); Fotios Konstantinidis, Laguna Niguel, CA (US); Shiv Bhatt, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/672,825

(22) Filed: Nov. 4, 2019

(65) Prior Publication Data

US 2020/0065807 A1 Feb. 27, 2020

Related U.S. Application Data

(63) Continuation of application No. 15/209,245, filed on Jul. 13, 2016, now Pat. No. 10,467,623.

(51) Int. Cl.
| | | |
|---|---|---|
| G06Q 40/00 | (2012.01) | |
| G06Q 20/40 | (2012.01) | |
| G06Q 20/36 | (2012.01) | |
| G06Q 20/32 | (2012.01) | |
| G06Q 20/02 | (2012.01) | |
| G06Q 20/38 | (2012.01) | |

(52) U.S. Cl.
CPC .......... *G06Q 20/401* (2013.01); *G06Q 20/02* (2013.01); *G06Q 20/3223* (2013.01); *G06Q 20/36* (2013.01); *G06Q 20/385* (2013.01); *G06Q 20/3821* (2013.01); *G06Q 20/40145* (2013.01)

(58) Field of Classification Search
CPC .. G06Q 40/00; G06Q 20/401; G06Q 20/3223; G06Q 20/36; G06Q 20/3821
See application file for complete search history.

(56) References Cited

U.S. PATENT DOCUMENTS

| | | |
|---|---|---|
| 9,946,906 B2 | 4/2018 | Ricci |
| 2014/0344153 A1 | 11/2014 | Raj |
| 2015/0220916 A1 | 8/2015 | Prakash |
| 2016/0125414 A1 | 5/2016 | Desai |
| 2018/0012425 A1 | 1/2018 | Ricci |

OTHER PUBLICATIONS

International Search Report and Written Opinion for PCT/US17/41496 dated Oct. 2, 2017, 11 pages.
Office Action dated Mar. 7, 2019 for U.S. Appl. No. 15/209,245 (pp. 1-11).
Implementation and performance evaluation of a payment protocol for vehicular ad hoc networksTellez isaac, Jes0s; Zeadally, Sherali; Sierra, Jose Camara. Electronic Commerce Research10.2: 209-233. Springer Science & Business Media. (Jun. 2010) (Year : 2010).
Notice of Allowance dated Jun. 26, 2019 for U.S. Appl. No. 15/209,245 (pp. 1-10).

*Primary Examiner* — Lalita M Hamilton
(74) *Attorney, Agent, or Firm* — Loeb & Loeb, LLP (57) ABSTRACT

A system and method which includes hardware and software is disclosed which may enable secure transactions from a vehicle.

20 Claims, 7 Drawing Sheets

ELECTRONIC SYSTEM HARDWARE FOR SECURE PAYMENTS FOR VEHICLES

CROSS-REFERENCE TO RELATED APPLICATION

This is a continuation application of U.S. patent application Ser. No. 15/209,245, filed on Jul. 13, 2016, and is related to a PCT International Patent Application filed, application number PCT/US17/41496, on Jul. 11, 2017, both of which are incorporated by reference in their entirety herein.

BACKGROUND

As electronic payments become more and more common, users desire more and more convenience when it comes to paying for goods and services. While mobile computing devices have enabled more convenient payment options, users desire more security and more convenience. Further, while mobile computing devices are useful, many jurisdictions have laws against using mobile computing devices while operating a vehicle.

Vehicle manufacturers wish to be able offer in-car commerce marketplaces for goods, services and entertainment. However these manufactures do not wish to have to handle personal payment account information or to become payment processors. Merchants wish to participate in digital commerce through in-car sales channels for vending things like fuel, parking, tolls, navigation, entertainment, payment for food/beverage at drive through, etc. However merchants would prefer a consistent method for processing payments and accepting orders across vehicle manufacturers. A system which includes hardware and software to enable vehicles to be part of a secure electronic transaction would be useful.

SUMMARY

A system and method which includes hardware and software is disclosed which may enable secure transactions from a vehicle. The system may include a mobile computing device or may utilize the computing devices that are part of the vehicle along with remote servers and cloud computing systems which may be part of the system to enable transactions to be completed in a vehicle.

A mobile wallet as a service like Visa Checkout may provide a payment backbone for the connected car. A wallet provider may offer a lightly branded 'powered by a wallet' payment service for storing consumer card numbers and a method to link a user's payment cards or accounts and payment preferences to a physical vehicle and user authentication method. Once linked, the wallet service may offer an API based checkout service that may validate commerce requests from the vehicle app store and then may generate commerce payloads in a standardized format to participating merchant vendors.

In another aspect, a user may "connect a card" to their car using a mobile app. The wallet app may provide an software development kit (SDK) to car manufacturers. The SDK may allow users to sign up or sign in to the wallet app and select a card or account to connected to their vehicle. The app may then connect to the car by means of Bluetooth or other means such as a one-time pairing code.

Once connected, the consumer may be able to shop for services on a store platform via the in-dash display and/or by voice commands with the car. The car may authenticate the customer by means of hardware factors (something the user has, the car) and something the user is (such as voice recognition or touch authentication) to request payment authorization.

To place orders, the vehicle may communicate to wallet provider servers directly through wireless modem or by tethering to a mobile app such as the mobile wallet application. The wallet application may receive an user authentication token from vehicle, a merchant ID and order details. The wallet application may validate the request and perform risk checks. On success, the wallet may generate a standard VCO payload with the merchant's encryption key and return a Call ID (an encrypted reference to this payload) to the app store platform powering the car. The app store platform may return the order and the Call ID to the merchant to fulfill. The merchant may use the Call ID to retrieve payment credentials from the wallet provider, decrypt the payment credentials and execute a transaction and fulfill the order.

DETAILED DESCRIPTION

As electronic payments become more and more common, users desire more and more convenience when it comes to paying for goods and services. While mobile computing devices have enable more convenient payment options, users desire more security and more convenience. Further, while mobile computing devices are useful, many jurisdictions have laws against using mobile computing devices while operating a vehicle. A system which includes hardware and software to enable vehicles to be part of a secure electronic transaction would be useful.

Further, there are considerable challenges in implementing a mobile wallet. Trying to maintain compliance with existing standards such as the PCI standard is a challenge. Further, trying to establish merchant integration for transfer of secure payment information is a challenge. Integration with existing token services is a challenge as the token service is not designed to work with vehicles. Convincing merchants to buy, install and support the necessary equipment as is a challenge. Finally, there are many payment devices which may need to be supported by the system.

In response, a system and method which include hardware and software is disclosed which enable secure transactions from a vehicle. The system may include a mobile computing device or may utilize the computing devices that are part of the vehicle along with remote servers and cloud computing systems which may be part of the system to enable transactions to be complete in a vehicle.

A system and method which includes hardware and software is disclosed which may enable secure transactions from a vehicle. The system may include a mobile computing device or may utilize the computing devices that are part of the vehicle along with remote servers and cloud computing systems which may be part of the system to enable transactions to be complete in a vehicle.

A mobile wallet as a service like Visa Checkout may provide a payment backbone for the connected vehicle 270 such as a car, a plane, a snowmobile, a golf cart, etc. A wallet provider may offer a lightly branded 'powered by a wallet payment service for storing consumer card numbers and a method to link a user's payment cards or accounts and payment preferences to a physical vehicle and user authentication method. Once linked, the wallet service may offer an API based checkout service that may validate commerce requests from the vehicle app store and then may generate commerce payloads in a standardized format to participating merchant vendors.

In another aspect, a user may "connect a card" to their car using a mobile app. The wallet app may provide an software development kit (SDK) to car manufacturers. The SDK may allow users to sign up or sign in to the wallet app and select a card or account to connected to their vehicle. The app may then connect to the car by means of Bluetooth or other means such as a one-time pairing code. In another embodiment, vehicle users may be prompted to add a car to establish payment functionality using the hardware in the vehicle.

Once connected, the consumer may be able to shop for services on a store platform via the in-dash display and/or by voice commands with the car. The car may authenticate the customer by means of hardware factors (something the user has, the car) and something the user is (such as voice recognition or touch authentication) to request payment authorization. The merchant applications may be displayed in the vehicle and payments may use the wallet application to assist in making payments.

To place orders, the vehicle may communicate to wallet provider servers directly through wireless modem or by tethering to a mobile app such as the mobile wallet application. The wallet application may receive an user authentication token from vehicle, a merchant ID and order details. The wallet application may validate the request and perform risk checks. On success, the wallet may generate a standard VCO payload with the merchant's encryption key and return a Call ID (an encrypted reference to this payload) to the app store platform powering the car. The app store platform may return the order and the Call ID to the merchant to fulfill. The merchant may use the Call ID to retrieve payment credentials from the wallet provider, decrypt the payment credentials and execute a transaction and fulfill the order. The button integration approach may be handled and or managed by an aggregator service. Similarly, the authentication approach may handle and or manage aggregator service.

The system may also allow a user to set up delivery preferences for goods or services purchased from the vehicle. For example, GPS may be used to establish the location of the vehicle and deliveries may be made to the GPS location. In other embodiments, a user may add a home address for goods and services to be delivered to the home address. In some embodiments, a user may be able to rotate through a carousel of previously entered addresses to select a delivery address.

In use, the payment system may have many unique abilities using the hardware designed to be part of the system. As an example, a user may be able to pay for gas using a dashboard in a car. Further, the car may know the amount of fuel needed and the current fuel price and may be able to request an authorization amount which is very precise. Applications from a variety of vendors may be available for download and use and the vendor applications may integrate with the integrated service to make payments in a vehicle secure and simple.

Further, the location of the vehicle may be used to select one payment device over another. For example, if the vehicle is near work, a work credit card may be selected to make payments. If the vehicle is near home, a personal credit card may be selected to make payments.

The solution solves many major technical challenges such as how to efficiently and securely make payments using existing payment systems. Using additional fields in electronic wallet communications, the vehicle may be to communicate additional information which may allow goods and services to be purchases using wallet applications. Additional benefits may be that existing wallet services may be used as part of the system which may already be familiar to consumers.

Figure 1A:
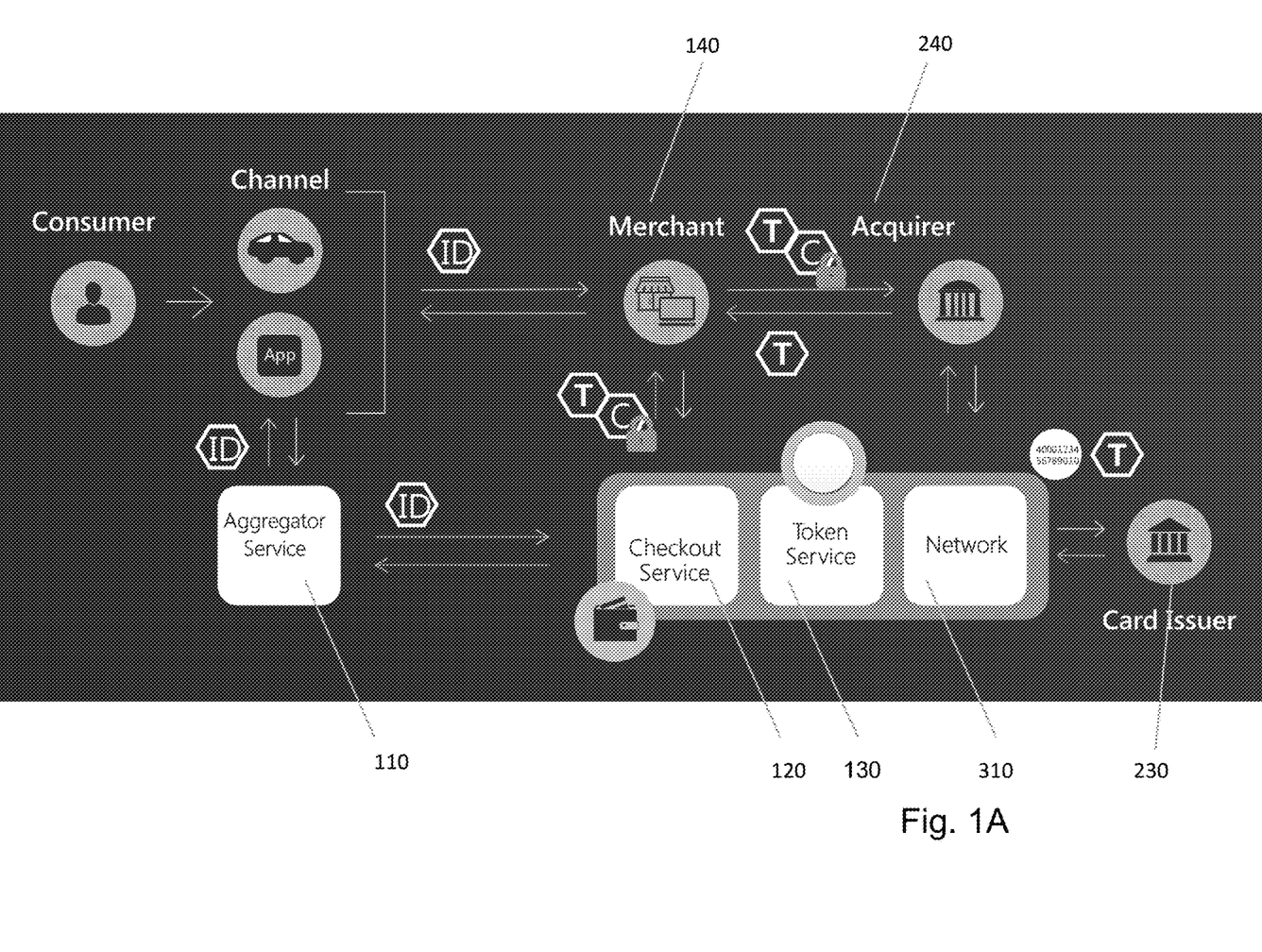
FIG. 1a is a high level illustration of the data flow for an electronic transaction involving a vehicle.

Referring to FIG. 1a, the illustration may be a high level overview of the system and method. A consumer may use an integrated front end on an electronic display to begin the process. An application may exist in the vehicle which may communicate with an aggregator service 110 including identification information. The identification information may be communicated to a payment service 120 where the identification information may be confirmed or denied. The results of the identification determination may be communicated to the application in the vehicle. The identification also may be communicated to a merchant application which may operate in the vehicle or may be communicated to the vehicle. The merchant may use the identification to verify a user and request payment information which may be in the form of a token from a token service 130 which may be provided by a wallet provider 120. The token may be used by the merchant application to complete the transaction.

Figure 1B:
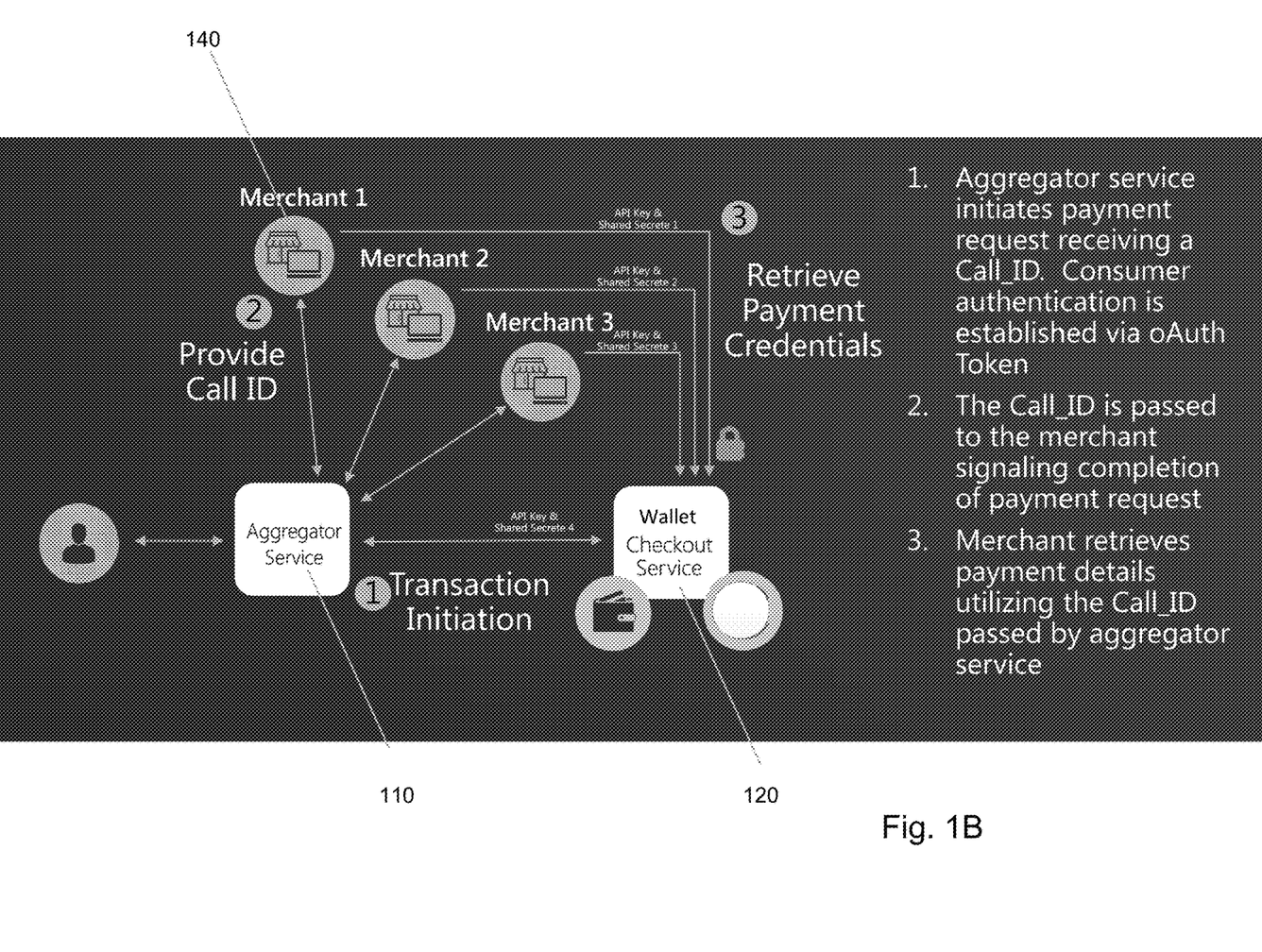
FIG. 1b is a high level illustration of the data flow for an electronic transaction involving a vehicle.

Referring to FIG. 1b, a consumer may interact with an aggregator service 110 to begin the process. The aggregator service 110 may initiate a payment request by receiving a Call Id from a vehicle. The Call ID may be a unique code that represents a vehicle.

The consumer may be authenticated using an authentication token generated from a checkout service 220 for security. The Call ID may be passed to the merchant 140 which may indicate the completion of a payment request. The merchant 140 may retrieve payment details utilizing the call id passed by the aggregator service.

The Call ID may be a code that is unique to the vehicle such that the vehicle may be recognized by the system. For example, a car Vehicle Identification Number (VIN) may be the Call ID. In another embodiment, a computing device in the vehicle may have a MAC address that may be unique and may be used as the Call ID. In yet other embodiments, the Call ID may be a one-time use code generated in a manner similar to an electronic token.

Figure 2:
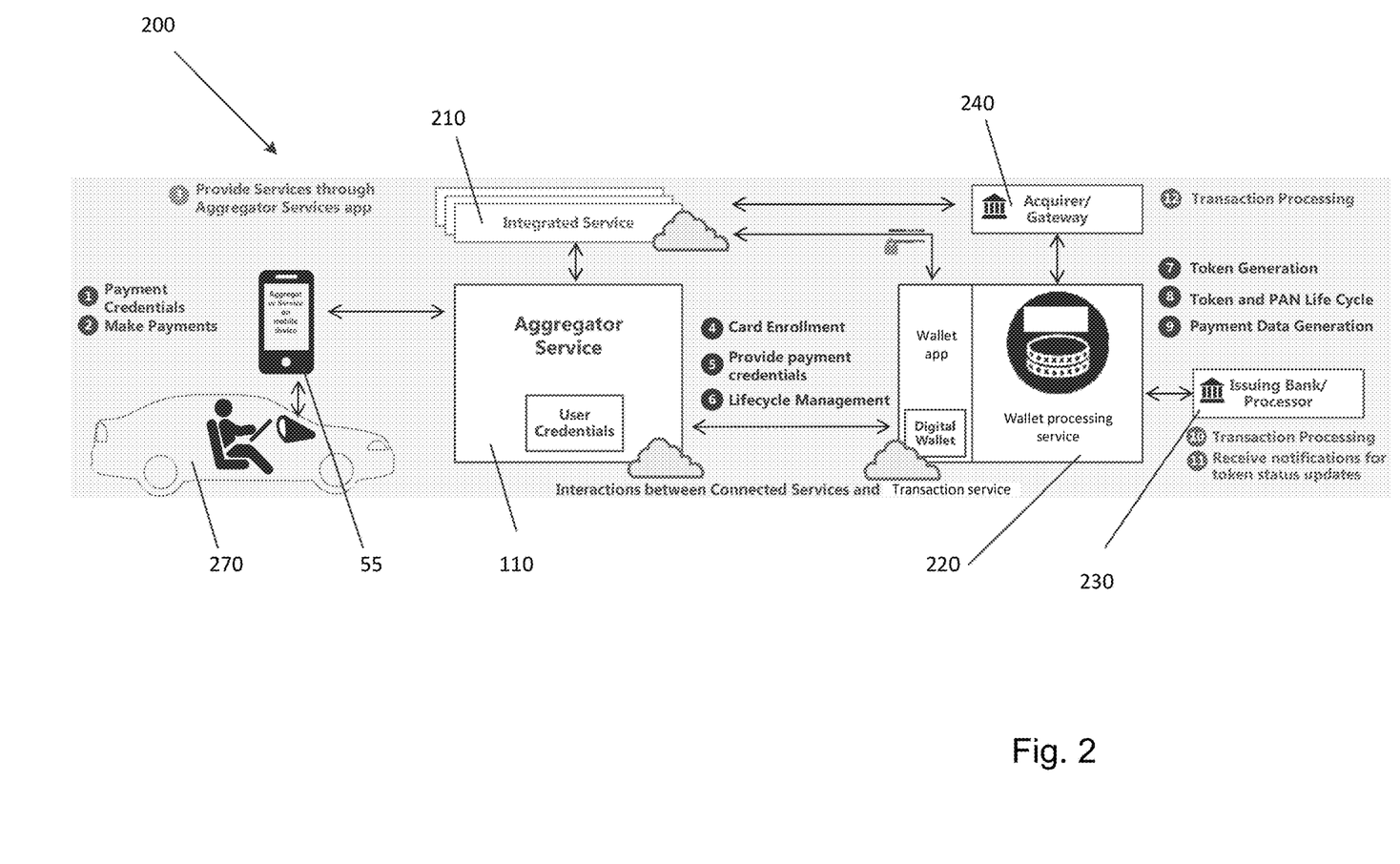
FIG. 2 is an illustration of the data flow through the elements of the system.

Referring to FIG. 2, an overview of the integration service 200 may be illustrated. The integration service 200 may operate on a dedicated server specifically designed and built to handle the demands of the integration service 200. At block 1, payment credentials may be added in the wallet application 220 as part of the aggregator services 110. Once the payment credentials are added, purchase services in the vehicle may be available through the connected services platform. For example, merchant applications may be download on the vehicle and may interface with the various aspects of the connected service platform to enable purchases.

At block 3, the integrated service 210 may integrate with the connected services platform 200 to provide services for the user through the aggregator services app 110. The integrated service 210 may integrate with the connected service platform 200 to provide services to the users. The aggregator service 110 may facilitate card enrollment, provide payment credentials and lifecycle management through APIs hosted on wallet service 220

The wallet processing service 220 may have a variety of purposes and may operate on one or more specially designed processors and servers to accommodate the demands on the server. The processing service 220 may generate tokens through a token server 130. Tokens may be a representation of an actual account number but not be the actual account number. The token may be verified and the processing service 220 may only know the actual account number for security sake. The wallet service 220 may create a token cryptogram unique for each transaction. The wallet processing 220 service may use the actual account number to create a payment by matching the token to an actual account number. The wallet processing service 220 may also enroll accounts in the mobile wallet. The wallet processing service may also provide payment credential to the integrated services 210. The wallet processing 220 apparatus may initiate requests to manage the card credential status and changes.

The issuing bank or processor 230 may process the transaction by properly assigning the funds to the various participants in a transaction. The issuing bank/processor 230 may also receive notifications for token status updates such as Auth, Clear, and Settle. An acquirer/gateway 240 may also interface with the wallet processing service 220 and the integration service 210 to assist in transaction processing.

Figure 3:
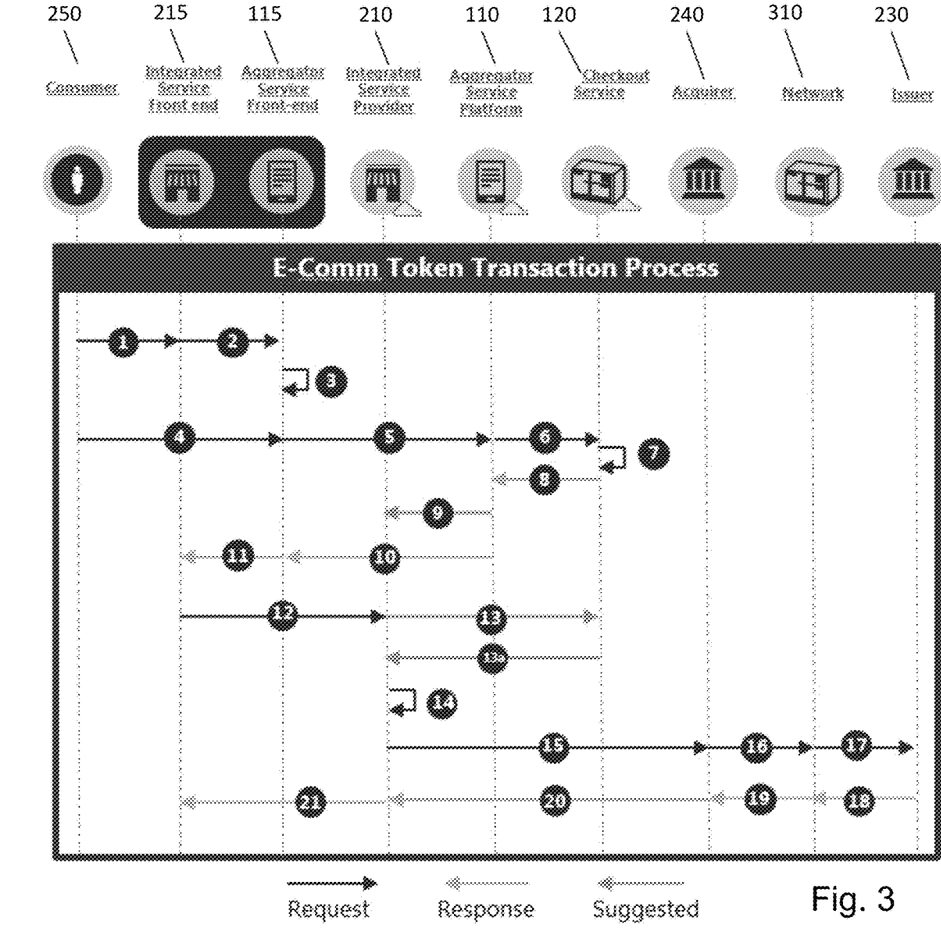
FIG. 3 is an illustration of the data flow through the elements of the system.
Figure 6:
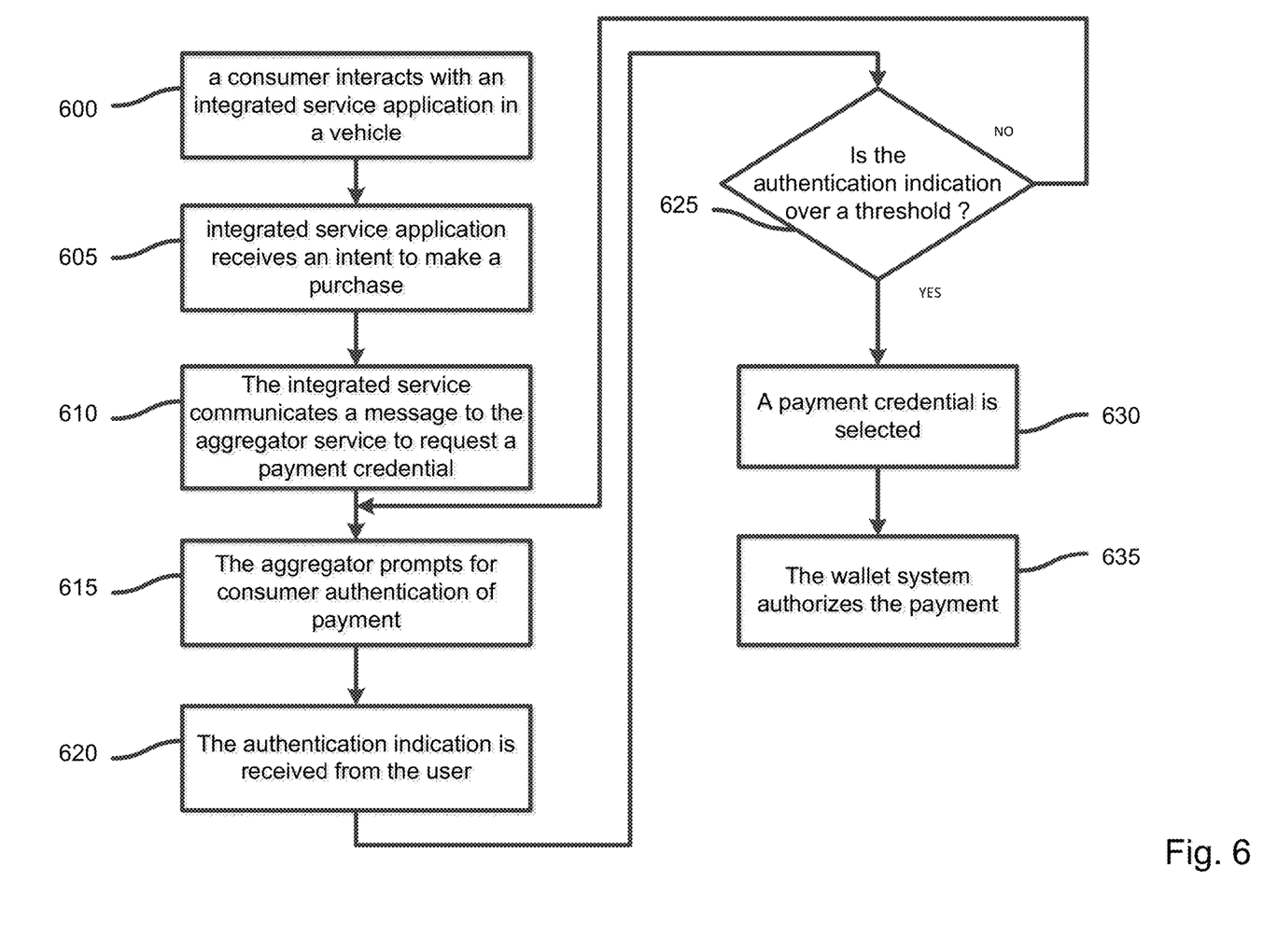
FIG. 6 is an illustration of the block performed by the system.

In FIGS. 3 and 6, a more detailed explanation of a service may be illustrated. At block 600, a consumer may interact with an integrated service application 220 in a vehicle. The integrated service application 220 may be illustrated in a graphical user interface in the vehicle or may be on a separate portable computing device that may be in the vehicle.

The user may indicate in the integrated service application, 220 an intent to make a purchase 605. The integrated service may communicate a message to the aggregator service (in the vehicle) to request a payment credential 610. The aggregator service may communicate with an aggregator platform for retrieval of the payment credentials or the aggregator may be present in the vehicle. The aggregator platform may be remote from the vehicle.

The aggregator service platform request for payment may include communicating a request to a payment/wallet application including passing an Auth token and payment parameters.

At block 615, the aggregator may prompt for consumer authentication of payment. The authentication may take many forms. For example, a steering wheel in a car may have fingerprint readers and the fingerprints of the user may be reviewed as part of the authentication. Similar, the vehicle may be a car and the car may have a microphone which may capture a user's voice and background noises which may be analyzed for authentication purposes. More specifically, a given automobile may have a characteristic sound. The background sound may be analyzed to determine if the request is coming from a known automobile. Logically, additional sensors may be used for authentication, from image sensors which may compare current images to known images, to retina scanners, to scent sensors to infrared or ultra sound sensor which may capture current inputs from a user and compare the inputs to known inputs. Thus at block 620, the authentication indication may be received from the use and at block 625, the authentication indication may be determined to be over a threshold or under a threshold. For example, characteristic of a voice may change slightly depending on health, time of day, etc. but the voice may still be authenticated with these variations.

At block 630, a user may select a payment credential. The credential may be a payment account from a plurality of payment accounts or may be a specific payment account set up for the vehicle. In addition, the payment credential may contain additional information such as the name of the vendor, the product or service being purchased, the amount of the purchase, the time of the purchase, the location of the merchant, etc. The aggregator service platform may encrypt then communicate the payment credentials to the integrated service provider platform. The aggregator service platform may respond to the connected service front end indicating that it has successfully acquired payment credentials. More specifically, the Aggregator Service front end may communicate/respond to the Integrated Service application indicating successful completion of acquiring payment credentials and passing unique transaction parameters & Call ID. The Integrated Service application may communicate with the Integrated Service platform to process the transaction.

The Integrated Service platform in response to not receiving payment credential from the Integrated Service application may communicate to the wallet application platform to receive the payment credentials using the unique transaction parameters received from the wallet app. Further, the wallet platform may communicates the encrypted payment credentials to the Integrated Service platform. The Integrated Service platform may decrypt the payment credentials using merchant specific keys.

At block 635, the wallet system 220 may authorize the payment. Assuming the fraud detection systems do not determine that fraud is likely based on the inputs and an algorithm, the transaction may be approved. The payment/wallet application 220 may also compile payment requests and the payment/wallet application may respond by providing the payment information & Call ID from the vehicle or portable computing device.

More specifically, the Integrated Service platform 210 may pass the PAN or token & crypto payment parameters to their acquirer 240 for authorization of the transaction in a business as usual type processing. The acquirer 240 may pass the payment authorization request to the network business 310 as usual type processing. The network 310 may detokenize the transaction, if applicable, and pass the payment authorization request to the issuer 230 for authorization approval and business as usual type processing. The account issuer 230 may confirm the authorization of the transaction and pass their response to the network 310 in business as usual type processing and the network 310 may pass the auth response to the acquirer 240. The acquirer 240 may pass the authorization response to the Integrated Service platform 210 and the Integrated Service platform 210 may notify the applicant that the transaction was successful.

The integrated service also may include a central marketplace of vendor applications which have been created using the Software Development Kit (SDK) that will interface with the payment service. The marketplace may accept vendor applications and may test them for compliance with the SDK. Once the vendor applications are accepted, the integrated services front end may allow the applications to be searched, downloaded and used. In some embodiments, the vendor applications may remain remote and the vehicle may access the vendor applications remotely through a remote communication link. The applications in the vehicle may be specific to the user and may be able to be arranged and displayed in a variety of different ways as desired by the user, such as by most popular, newest, geographically closest, etc.

Figure 4:
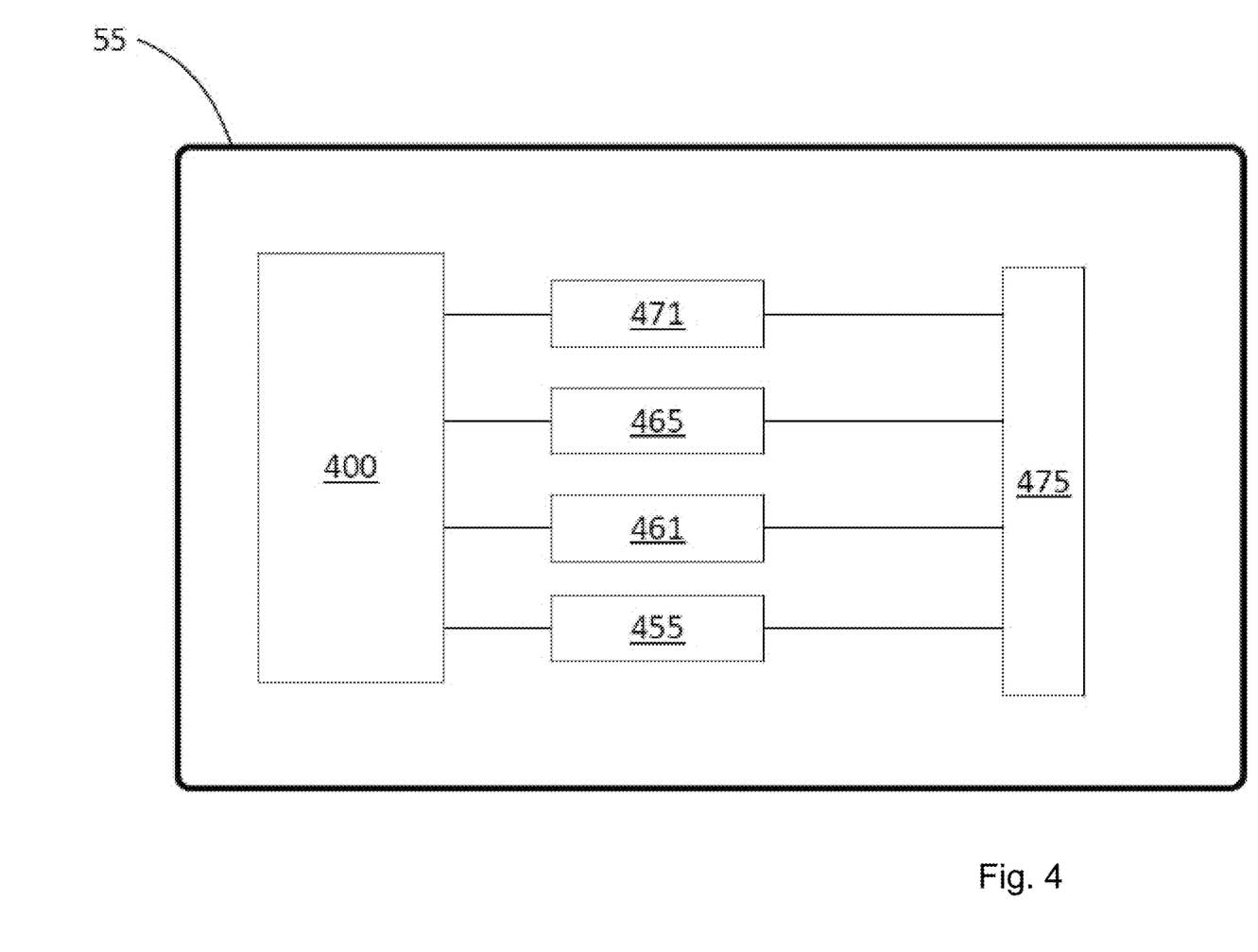
FIG. 4 is an illustration of a portable computing device.
Figure 5:
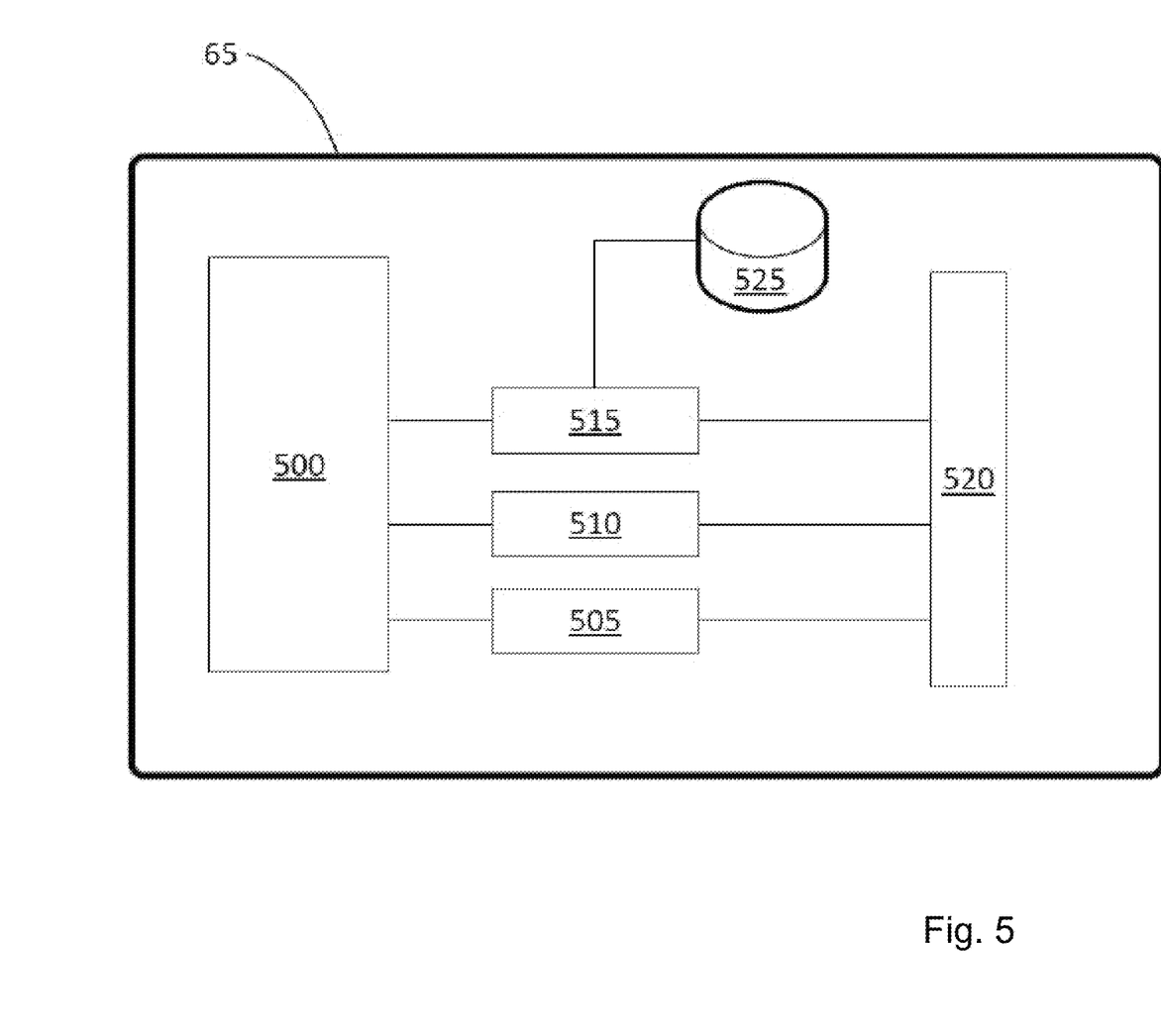
FIG. 5 is an illustration of a server type computing device.

FIG. 4 is a simplified illustration of the physical elements that make up an embodiment of a computing device 55 and FIG. 5 is a simplified illustration of the physical elements that make up an embodiment of a server type computing device, such as the aggregator server 110, but the various servers may reflect similar physical elements in some embodiments.

Referring to FIG. 4, a sample portable computing device 55 is illustrated that is physically configured according to be part of the computing system 50. The portable computing device 55 may have a processor 451 that is physically configured according to computer executable instructions. In some embodiments, the processor can be specially designed or configured to optimize communication between the server 65 and the computing device 55 relating to the preference application system discussed herein. The computing device 55 may have a portable power supply 455 such as a battery which may be rechargeable. It may also have a sound and video module 461 which assists in displaying video and sound and may turn off when not in use to conserve power and battery life. The computing device 55 may also have volatile memory 465 and non-volatile memory 471. The computing device 55 may have GPS capabilities that may be a separate circuit or may be part of the processor 451. There also may be an input/output bus 475 that shuttles data to and from the various user input/output devices such as a microphone, the camera 108, a display 102, or other input/output devices. The portable computing device 101 also may control communicating with the networks, either through wireless or wired devices. Of course, this is just one embodiment of the portable computing device 101 and the number and types of portable computing devices 101 is limited only by the imagination.

The physical elements that make up an embodiment of a server, such as the wallet server 220 or other services that use a dedicated server may be further illustrated in FIG. 5. At a high level, the server 65 may include a digital storage such as a magnetic disk, an optical disk, flash storage, non-volatile storage, etc. Structured data may be stored in the digital storage such as in a database. More specifically, the server 65 may have a processor 500 that is physically configured according to computer executable instructions. In some embodiments, the processor 500 can be specially designed or configured to optimize communication between a portable computing device, such as computing device 55 or 130, and the server 65 relating to the e-commerce enabler application and reward points incentive system as described herein. The server 65 may also have a sound and video module 505 which assists in displaying video and sound and may turn off when not in use to conserve power and battery life. The server 65 may also have volatile memory 510 and non-volatile memory 315.

A database 525 for digitally storing structured data may be stored in the memory 510 or 515 or may be separate. The database 525 may also be part of a cloud of servers and may be stored in a distributed manner across a plurality of servers. There also may be an input/output bus 520 that shuttles data to and from the various user input devices such as a microphone, a camera, a display monitor or screen, etc. The input/output bus 520 also may control communicating with the networks, such as communication network 310 and payment network, either through wireless or wired devices.

In some embodiments, the e-commerce software application running the preference engine may be located on the computing device 55. However, in other embodiments, the application may be located on e-commerce server 55, or both the computing device and the server 65. Of course, this is just one embodiment of the e-commerce server 65 and additional types of servers are contemplated herein.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s). Alternatively, the user devices, computers and servers described herein may be special purpose computer devices and servers designed specifically for the tasks and routines disclosed.

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated. The attached Appendix may provide more detail regarding the operation of a payment system.

The present disclosure provides a solution to the long-felt need described above. In particular, the systems and methods described herein may be configured for improving payment systems and offers. The offers may be based on data not previously studied as the data was too large and overwhelming to be properly reviewed in a meaningful way.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computer implemented method of linking a vehicle to a payment service over a network for a transaction comprising:
   receiving an intent to make a transaction from a consumer via interactions with a graphical user interface of an application on a vehicle;
   communicating a message to an aggregator service executable in a processor associated with the vehicle requesting a payment credential from an aggregator service platform, wherein the payment credential comprises a payment account from a plurality of payment accounts associated with the consumer, a name of a merchant, a product or service being transacted, an amount of the transaction, a time of the transaction, a location of the merchant;
   prompting, via the application, the consumer for a consumer authentication of payment;
   receiving from the consumer an authentication indication for the consumer authentication of payment, said authentication indication comprising at least one of the following: a fingerprint of the consumer, a voice of the consumer and background noise of the vehicle, or a use of the vehicle by the consumer; and
   receiving another request from the aggregator service communicating to a wallet application on the mobile device including passing an authentication token and payment parameters, wherein the wallet application compiles a payment request and provides the payment information and a Call ID from the vehicle or the mobile device.

2. The computer implemented method of claim 1, wherein the aggregator service communicates with the aggregator service platform for retrieval of the payment credentials.

3. The computer implemented method of claim 1, wherein the aggregator service platform is remote from the vehicle.

4. The computer implemented method of claim 1, wherein the aggregator service platform encrypts the payment credential and communicates the encrypted payment credential to the integrated service provider platform.

5. The computer implemented method of claim 1, wherein the aggregator service platform responds to a connected service front end indicating that it has successfully acquired payment credential.

6. The computer implemented method of claim 1, further comprising an aggregator service front end of the aggregator service platform, said aggregator service front end being configured to communicate with the application indicating successful completion of acquiring the payment credential& and passing unique transaction parameters and the Call ID.

7. The computer implemented method of claim 1, further communicating with an integrated service provider platform to process the transaction.

8. The computer implemented method of claim 7, wherein the integrated service provider platform in response to not receiving the payment credential, is configured to communicate to a wallet platform to receive the payment credential using unique transaction parameters received from the wallet application.

9. The computer implemented method of claim 8, wherein the wallet platform is configured to communicate the encrypted payment credential to the integrated service provider platform.

10. The computer implemented method of claim 9, wherein the integrated service provider platform is configured to decrypt the payment credential using a merchant specific key thereof.

11. The computer implemented method of claim 10, wherein the integrated service provider platform is configured to pass a PAN or token and crypto payment parameters to an acquirer for authorization of the transaction.

12. The computer implemented method of claim 11, wherein the acquirer is configured to pass a payment authorization request to the network.

13. The computer implemented method of claim 12, wherein the network is configured to detokenize the transaction and passes the payment authorization request to an issuer for an authorization approval.

14. The computer implemented method of claim 13, wherein the issuer is configured to confirm the authorization approval of the transaction and to pass a response to the network.

15. The computer implemented method of claim 12, wherein the network is configured to pass an authorization response to the acquirer.

16. The computer implemented method of claim 15, wherein the acquirer is configured to pass the authorization response to the integrated Service platform.

17. The computer implemented method of claim 16, wherein the integrated service provider platform is configured to notify that the transaction was successful.

18. A system of linking a vehicle to a payment service over a network for a transaction comprising:

an application in a vehicle is configured to receive an intent to make a transaction from a consumer via interactions with a graphical user interface of the application on the vehicle;

an aggregator service, wherein the aggregator service is configured to receive from the application a message requesting a payment credential from an aggregator service platform, wherein the payment credential comprises a payment account from a plurality of payment accounts associated with the consumer, a name of a merchant, a product or service being transacted, an amount of the transaction, a time of the transaction, a location of the merchant;

wherein the application is configured to prompt the consumer for a consumer authentication of payment;

wherein the application is configured to receive from the consumer an authentication indication for the consumer authentication of payment, said authentication indication comprising at least one of the following: a fingerprint of the consumer, a voice of the consumer and background noise of the vehicle, or a use of the vehicle by the consumer; and wherein the aggregator service is configured to communicate to a wallet application on a mobile device including passing an authentication token and payment parameters, wherein the wallet application compiles a payment request and provides the payment information and a Call ID from the vehicle or the mobile device.

19. The system of claim 18, wherein the aggregator service is configured to communicate with the aggregator service platform for retrieval of the payment credentials.

20. A tangible non-transitory computer-readable medium stored thereon computer-executable instructions for linking a vehicle to a payment service over a network for a transaction comprising:

receiving an intent to make a transaction from a consumer via interactions with a graphical user interface in an application on a vehicle;

communicating a message to an aggregator service executable in a processor associated with the vehicle requesting a payment credential from an aggregator service platform, wherein the payment credential comprises a payment account from a plurality of payment accounts associated with the consumer, a name of a merchant, a product or service being transacted, an amount of the transaction, a time of the transaction, a location of the merchant;

prompting, via the application, the consumer for a consumer authentication of payment;

receiving from the consumer an authentication indication for the consumer authentication of payment, said authentication indication comprising at least one of the following: a fingerprint of the consumer, a voice of the consumer and background noise of the vehicle, or a use of the vehicle by the consumer; and receiving another request from an aggregator service communicating to a wallet application on the mobile device including passing an authentication token and payment parameters, wherein the wallet application compiles a payment request and provides the payment information and a Call ID from the vehicle or the mobile device.

\* \* \* \* \*